Patented Nov. 25, 1947

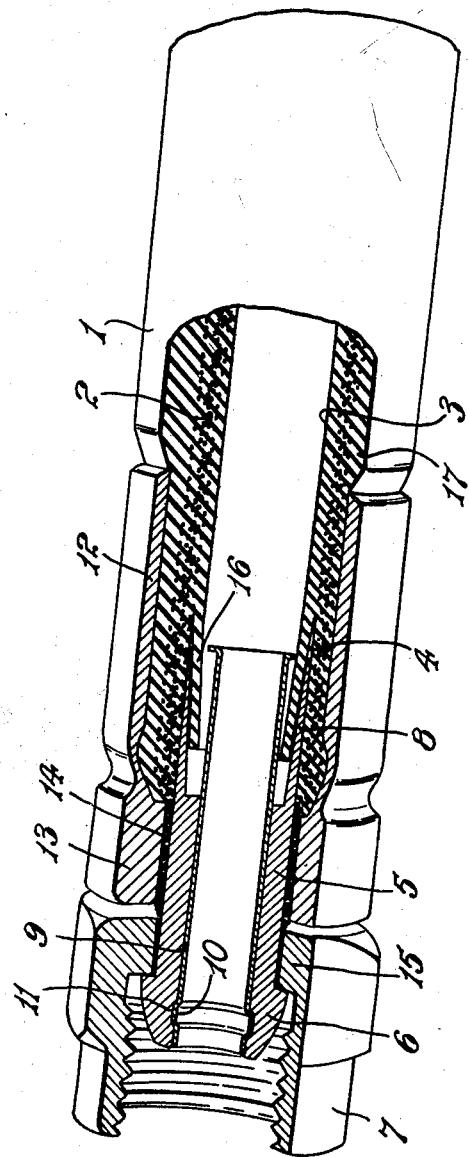

2,431,522

UNITED STATES PATENT OFFICE 2,431,522

HOSE CONNECTION

Henry Trevaskis, Solihull, Birmingham, England, assignor to Dunlop Rubber Company Limited, London, England, a British company Application January 17, 1945, Serial No. 573,160
In Great Britain January 19, 1944

3 Claims. (Cl. 285—72)

My invention concerns improvements in connections for hose of the kind composed of rubber or synthetic rubber-like material having an imbedded or external reinforcing layer of inextensible material.

The invention has for its object to provide a leak-proof joint capable of withstanding the bursting pressure of the hose and which remains unaffected by vibration and pressure impulses when installed on aircraft and in other positions subject to such impulses.

According to this invention a hose coupling unit comprises a tubular insert, a sleeve, and a flexible hose of the type comprising an inner layer of rubber or the like material and a layer of reinforcing material wherein said reinforcing material is clamped between the said tubular insert and the said sleeve and the said tubular insert has a tapered extremity positioned in a cylindrical slit in the said inner layer of rubber.

Preferably the tapered extremity of the insert is of the same diameter as the body of the insert the bore of which is fitted with a thin metal tube of substantially the same length as the insert.

In order that the invention may be more clearly understood and readily carried into practical effect reference is made, in further describing the same, to the accompanying drawing showing a part sectional view of a hose coupling unit constructed in accordance with the invention.

As shown in the drawing a convenient embodiment of the invention includes a hose 1 composed of rubber or synthetic rubber-like material having a reinforcing layer 2 of braided wire of high tensile strength which may be lined with canvas, said reinforcing layer being embedded in the wall of the hose or forming the outer surface of the hose. The inner layer of rubber 16 between the reinforcing layer 2 and the bore 3 of the hose is cut concentrically with the hose to provide a cylindrical slit 4 extending inwardly from the end of the hose. The inner rubber layer 16 and any outer rubber layer 17 is removed at 14 adjacent the end of the hose to bare the metal of the reinforcing layer 2 before the reinforcing layer so bared is clamped to the tubular member 5 hereinafter referred to as the insert.

The internal diameter of the insert is enlarged and extended at its inner end within the hose to provide a tapered extremity 8 which is of the same external diameter as the body 5 of the insert and is positioned within the cylindrical slit 4 in the inner layer of rubber, the walls of said slit overlapping the tapered extremity of the insert. The cylindrical body portion of the insert is provided at its outer end with an external shoulder 6 and with a rotatable coupling nut 7 having an internal lip 15 slidable against the shoulder of the insert, the nut being internally threaded for attachment to the threaded end of a pipe or like union.

The pressure of the fluid flowing through the hose forces the rubber layer 16 contained by the projecting extremity of the insert into intimate leak-proof contact with the internally tapered surface thereof. In order to prevent any tendency of the fluid on reversal of flow, to prise the inner layer of rubber from the tapered extremity of the insert which would tend to close or obstruct the bore of the hose a thin metal tube 9 of substantially the same length as the insert is fitted to the bore of the insert said tube projecting from the insert within the hose substantially to the end of the slit 4.

In order to locate the tube axially within the insert the bore of the tube may be enlarged at 10 to register with an annular groove 11 formed in the bore of the insert. The hose is enclosed or sheathed in an outer metal sleeve 12 which may be of uniform diameter and thickness said sleeve merging at its outer end beyond the rubber of the hose into a thickened ring part 13 adapted to be deformed by external pressure to clamp the bared reinforcing layer into intimate contact with the external surface of the insert.

It will be apparent that the rubber-like material of which the hose is made may be of any suitable composition, either of natural or synthetic origin as, for example, India rubber, balata, synthetic rubber or other similar polymerized organic compounds or mixtures thereof together with any desired fillers or compounding ingredients, it being only necessary that the material have sufficient resiliency, strength and resistance for the purpose for which a hose is to be used. The term "rubber material" is used to include all rubber material and similar compositions.

Having described my invention, what I claim is:

1. A coupling unit which comprises a flexible hose of rubber material having reinforcing wires projecting beyond the end of said rubber material, said hose having a cylindrical slit extending into said rubber material within said reinforcing wires, a tubular insert extending within said reinforcing wires and into said cylindrical slit, a sleeve compressed on said extending reinforcing wires to grip said wires tightly onto said insert and a tube extending from said insert into said hose.

2. A coupling unit which comprises a flexible hose of rubber material having reinforcing wires embedded therein, said rubber material forming a layer within said reinforcing wires and said hose having a substantially cylindrical slit in said layer of rubber material, a tubular insert extending into said slit, a sleeve on said hose clamping the reinforcing wires on said insert, and a tube fitted in the bore of said insert and projecting into said hose within said inner layer of rubber material.

3. A coupling unit which comprises a flexible hose of rubber material having reinforcing wires embedded therein, said rubber material forming a layer within said reinforcing wires, and said hose having a substantially cylindrical slit in said layer of rubber material, said rubber material being removed from the interior and exterior surface of said reinforcing wires to bare said wires for a short distance from the end thereof, a tubular insert extending into said slit and having its outer surface in contact with the bared portion of said reinforcing wires, and a sleeve contracted on said hose about the outer bared surface of said reinforcing wires to clamp and hold said reinforcing wires on said insert.

HENRY TREVASKIS.

REFERENCES CITED

The following references are of record in the file of this patent:

UNITED STATES PATENTS

| Number | Name | Date |
|---|---|---|
| 1,969,548 | Eastman | Aug. 7, 1934 |
| 2,234,350 | Muller | Mar. 11, 1941 |
| 2,394,632 | Parker | Feb. 12, 1946 |

FOREIGN PATENTS

| Number | Country | Date |
|---|---|---|
| 568,964 | Germany | Jan. 26, 1933 |